United States Patent [19]

Yoshimi

[11] 4,066,490
[45] Jan. 3, 1978

[54] METHOD FOR PRODUCING A LAWN NURSERY STRIP

[75] Inventor: Mitsuru Yoshimi, Okazaki, Japan

[73] Assignee: Shin Nihon Ryokugaku Kabushiki Kaisha, Japan

[21] Appl. No.: 695,813

[22] Filed: June 14, 1976

Related U.S. Application Data

[63] Continuation of Ser. No. 520,985, Nov. 5, 1974, abandoned.

[51] Int. Cl.² .............................................. A01C 1/04
[52] U.S. Cl. ....................................... 156/276; 47/56; 156/278; 427/57; 427/203; 427/286; 427/324
[58] Field of Search ................... 427/4, 202, 203, 424, 427/57, 346, 324, 286; 47/56; 156/276, 278

[56] References Cited

U.S. PATENT DOCUMENTS

| 1,143,980 | 6/1915 | McComb | 47/56 |
| 2,323,746 | 7/1943 | Woolf et al. | 47/56 |
| 2,648,165 | 8/1953 | Nestor | 47/56 |
| 3,080,681 | 3/1963 | Merrill et al. | 47/56 |
| 3,315,408 | 4/1967 | Fisher | 47/9 |

Primary Examiner—Bernard D. Pianalto
Attorney, Agent, or Firm—Hill, Gross, Simpson, Van Santen, Steadman, Chiara & Simpson

[57] ABSTRACT

A lawn nursery strip is provided by apparatus employing regenerated cotton to form a strip with a raised nap on a front side. The rear of the strip is sequentially fertilized, bonded, and strengthened; then the napped front of the strip is sequentially seeded, fertilized, bonded, and covered. The strip is rolled compactly by the apparatus described for transport or storage until needed for use.

1 Claim, 2 Drawing Figures

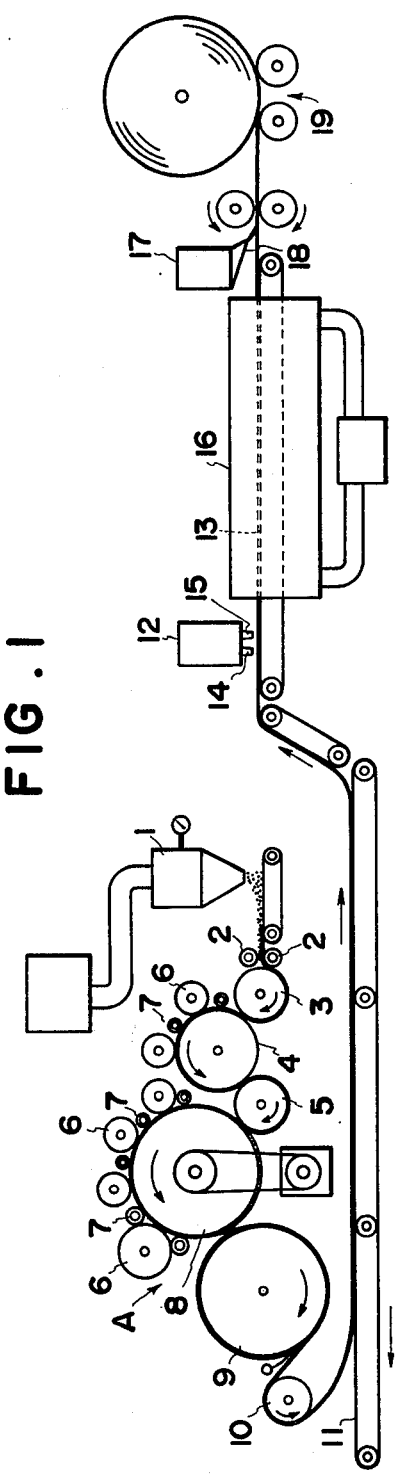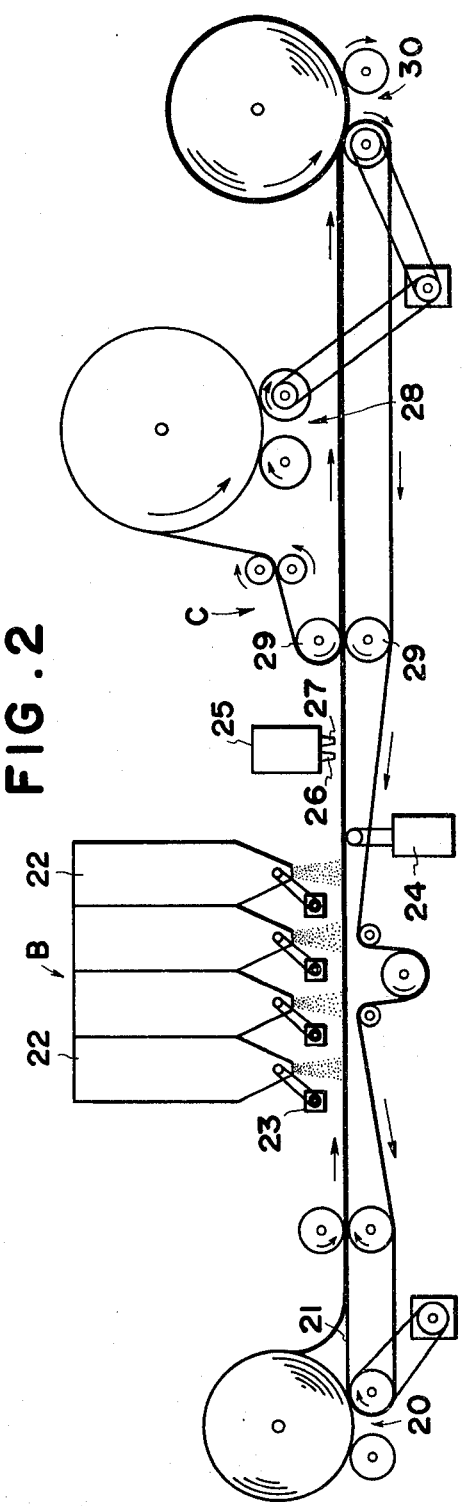

METHOD FOR PRODUCING A LAWN NURSERY STRIP

This is a continuation, of application Ser. No. 520,985, filed Nov. 5, 1974, now abandoned.

BACKGROUND OF THE INVENTION

1. Field of the invention

This invention relates to a method of and an apparatus for producing a nursery strip for planting a lawn or greensward on a golf course, playground, garden, earth-filled dike or the like.

2. Description of the Prior Art

It is a common need to plant grass on areas where erosion would wash away individual seeds planted in bare earth. A traditional solution to the need is to lay sod over the areas subject to erosion, using growing grass taken with a thin layer of top soil held by the roots of the grass from an established area. Other solutions include attempting to stop or control the erosion by laying hay or straw on newly seeded areas. A modern approach is to use hoses or nozzles to apply a mixture of seeds, fertilizer, fibers, and binding agents to soil which would be subject to erosion as well as to flat surfaces.

SUMMARY OF THE INVENTION

The object of the invention is to provide a convenient, transportable lawn planting strip which requires no fertilization during growth and which is resistant to accidental tearing or cutting. More specifically, there are provided according to the present invention a lawn nursery strip producing method and an apparatus therefor. Inexpensive cotton material such as regenerated cotton is fed into a carder to form processed cotton having nep naps or fiber knots on one surface; then this processed cotton is fed under a spreader where liquid fertilizer and/or binder is spread on the back side of said processed cotton strip, the latter being then delivered into a dryer where the spread liquid is dried. A quickdrying resin is also applied to the back side of the cotton strip in multiple lines in the longitudinal direction of the strip to increase the longitudinal strength of the strip. Then the strip is carried below a seeder where uniform seeding is accomplished on the front surface of the strip, and thereafter a liquid binder is spread on the strip surface by a spreader so that the seeds are securely fixed in the spaces between the fibers of the nap. Liquid fertilizer may also be applied to the upper surface of the strip. The thus treated strip is finally subjected to a press bonding process wherein a non-woven fabric or similar net-like material is integrally bonded onto the strip surface. Seeds in the completed nursery strip cannot be dislocated or removed during transportation, nor can the nursery cotton easily be cut or torn.

BRIEF DESCRIPTION OF THE DRAWINGS

FIG. 1 is a side elevation showing the first half portion of the apparatus of the present invention.

FIG. 2 is a side elevation showing the last half of the apparatus.

DESCRIPTION OF THE PREFERRED EMBODIMENTS

In the drawings, A designates a carding machine portion of the apparatus of the invention. Cotton material such as regenerate cotton is fed at a constant rate from a hopper 1 and passed through feed rollers 2, take in 3, breast roll 4, transporter 5, strippers 6, and walkers 7 to be thereby gradually processed and then fed into a space between a cylinder 8 and a doffer 9. The space between the cylinder 8 and the doffer 9 is slightly increased to form processed cotton having a nap or waffle pattern on one of its surfaces. The strip of processed cotton thus formed by the carding machine A is turned by a turn-over roller 10 and further carried forward on a belt conveyor 11. A spreader 12 is provided above a second belt conveyor 13 and arranged to spread liquid fertilizer from a front nozzle 14 and liquid binder from the rear nozzle 15 to a back side of the strip of processed cotton carried thereunder.

A dryer 16 dries the strip of processed cotton with said liquid binder and liquid fertilizer on its back side while the strip is passed therethrough on the belt conveyor 13, to produce a dried nursery cotton. A second spreader 17 therebeyond has at its bottom many equidistantly arranged nozzles 18 which leach quick drying synthetic resin liquid continuously onto the back side of the strip of nursery cotton as it emerges from the dryer 16, to form longitudinal streaks on said strip for increasing tensile strength in the longitudinal direction. At the terminal end of the belt conveyor 13 is provided in one embodiment a take-up roller assembly 19 adapted to wind up the strip of nursery cotton.

A feed roller assembly 20 delivers the strip of nursery cotton onto a belt conveyor 21 with the nep napped surfaces thereof facing upwardly.

A seeder B comprising several juxtaposed seed tanks 22 is arranged above and transversely to the belt conveyor 21 so that different kinds of seeds may be sown successively under the control of motors 23 or other means from the bottom of the respective tanks 22 onto the front or upper surface of the strip of nursery cotton. A vibrator 24 vibrates the belt conveyor 21 so that the seeds sown on the surface of the strip of nursery cotton thereon will be settled stably in the nep nap. Also provided above said belt conveyor 21 is a further spreader 25 adapted to spread liquid fertilizer from a front nozzle 26 and liquid binder from a rear nozzle 27 over the surface of said nursery cotton strip on which the seeds have been sown.

A press bonding mechanism C bonds a non-woven fabric or similar net-like material, which is delivered from a feed roller assembly 28, to the upper surface of the nursery cotton strip by press bonding rollers 29. A take-up roller assembly 30 winds up the completed lawn nursery strip for transporting and storage.

Thus, according to the above-described sequence of the present invention, the inexpensive cotton material such as regenerated cotton fed into the carding machine A is formed into a strip of processed cotton having a nep napped, balled, or waffled surface. Said strip is then turned over by the roller 10 and further carried forward on the belt conveyor 11 and beneath the spreader 12, where liquid binder and possibly liquid fertilizer are spread over its rear surface. The strip is then passed through the dryer 16 for drying said liquid binder and fertilizer on said strip surface, thereby forming a strip of dried nursery cotton which is increased in tensile strength by said liquid binder and also impregnated with fertilizer. Thereafter, quick drying synthetic resin ldiquid is continuously leached to the rear side of the strip of nursery cotton from nozzles 18 arranged at the bottom of the spreader 17 so as to form longitudinal streaks designed to increase the strip's tensile strength. The thus treated strip may be wound up by the take-up roller assembly 19 before being successively delivered out from a delivery roller assembly 20 onto a further belt conveyor 21 with the napped surface of the strip facing upwards. The strip is carried by said belt conveyor 21 beneath the seeder B where various kinds of lawn seeds differing in size and weight, such as spring-sown seeds and autumn-sown seeds, and stored in the respective seed tanks 22 arranged in a row above and transversely to said belt conveyor 21 are sown uniformly while controlled by motors 23 or other means onto the napped surface of the strip which has been carried thereto, and the thus sown seeds are settled stably in the spaces between the nep naps by the vibrator 24 provided below said belt conveyor 21, followed by additional spreading of liquid binder and liquid fertilizer over said strip surface by the spreader 25. Then a non-woven fabric or net delivered from a delivery assembly 28 of the press bonding machine C provided above the belt conveyor 21 is press-bonded to the binder-applied strip surface and the thus formed lamination is wound up by the take-up roller assembly 30. Thus, according to the present invention, it is possible to successively and automatically produce lawn nursery strips in which the seeds held in the spaces in the nap will not shift during transportation and the strip is resistant to cutting and tearing during placement and which also requires no fertilization during initial growth of the lawn.

In the above-described embodiment of the present invention, the nursery strip formed with longitudinal streaks of synthetic resin on its surface from the spreader 17 is once wound up by take-up roller assembly 19 and then transferred to the feed roller assembly 20, but is also possible to turn over the strip by using an inversion roller or other layout to carry the strip continuously to the seeder B.

Although various modifications might be suggested by those versed in the art, it should be understood that I wish to embody within the scope of the patent warranted hereon all such modifications as reasonably and properly come within the scope of my contribution to the art.

I claim as my invention:

1. The method of making a nursery seeding strip which includes the sequential steps of, feeding and carding regenerated cotton fibers at a constant rate to form a strip of processed cotton material which is napped and waffled on one side, successively spreading first liquid fertilizer and then liquid binder in the form of a spray to coat the opposite side of the strip with fertilizer and liquid binder, thereafter drying the coated strip to produce a dried nursery cotton strip, simultaneously leaching localized bands of synthetic liquid resins continuously onto the coated side of the nursery cotton strip to form longitudinal streaks on the nursery strip for increasing the tensile strength thereof in a longitudinal direction, sowing seeds onto the opposite side of the nursery cotton strip, vibrating the strip so that the sown seeds will settle stably into the napped surface of the strip, successively spreading first liquid fertilizer and then liquid binder in the form of a spray over the napped, seeded surface, and press bonding a non-woven, net-like material onto the surface to form the completed seeding strip.

* * * * *